3,557,112
CERTAIN 2-(HALOALKENYLTHIO)-4,6-
DIMETHYLPYRIMIDINES
John Joseph D'Amico, Akron, Ohio, assignor to Monsanto
Company, St. Louis, Mo., a corporation of Delaware
No Drawing. Filed Feb. 27, 1969, Ser. No. 803,050
Int. Cl. C07d 51/40
U.S. Cl. 260—251                                  7 Claims

ABSTRACT OF THE DISCLOSURE

Compounds of the formula:

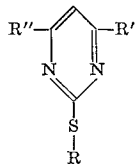

where R is is $-CH_2CBr=CH_2$ or $-CH_2CH=CX_2$, $-CH_2CX=C(X)H$, $-CH_2CX=CX_2$ or
$-CH_2CH=CXCH_3$ where X is Cl or Br; and R' and R'' are lower alkyl, useful for controlling growth of undesirable vegetation.

SUMMARY OF THE INVENTION

This invention relates to certain 2-(haloalkenylthio)-4,6-di(lower alkyl)pyrimidines useful for controlling undesired vegetation. More specifically, the invention relates to compounds of the formula:

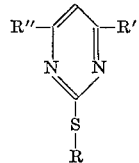

where R is $-CH_2CBr=CH_2$ or $-CH_2CH=CX_2$, $-CH_2CX=C(X)H$ $-CH_2CX=CX_2$ or $-CH_2CH=CXCH_3$ where X is Cl or Br. Preferably R is 3,3-dichloroallyl, 2,3-dichloroallyl, 2,3,3-trichloroallyl or 3-chloro-2-butenyl. R' and R'' are lower alkyl.

DESCRIPTION OF PREFERRED EMBODIMENTS

The 2-(haloalkenylthio) - 4,6 - di(lower alkyl)pyrimidines are not necessarily toxic to vegetation but the new compounds of this invention are valuable pre-emergence herbicides. They may be conveniently prepared by reacting 2-mercapto 4,6-di(lower alkyl)pyrimidine with a suitable halogen substituted alkene in the presence of a hydrogen halide acceptor. The following examples illustrated specific embodiments of the invention but the invention is not limited thereto.

Example 1

To a solution containing 44.2 grams (0.25 mole) of 2-mercapto-4,6 dimethylpyrimidine hydrogen chloride, 80 grams (0.5 mole) 25% sodium hydroxide, and 300 ml. of water was added 31.2 grams (0.25 mole) 1,3 dichloro-2 butene. The stirred mixture was then heated at 50–60° C. for 24 hours, cooled to 25° C. and the reaction mixture was extracted with 400 ml. of ethyl ether. The ether solution was washed with water until neutral to litmus and dried over sodium sulfate. The ether was removed by stripping at 80–90° C. at 1–2 mm., to obtain the product, 2-(3-chloro-2-butenylthio) - 4,6 - dimethylpyrimidine, an amber colored liquid. 50 grams of product was recovered to give a yield of 87%. Analysis gave 12.01% nitrogen, 14.20% sulfur and 15.29% chlorine compared to 12.25% nitrogen, 14.02% sulfur and 15.50% chlorine calculated for $C_{10}H_{13}ClN_2S$.

Example 2

In the manner described in Example 1, 38.9 grams (0.25 mole) of 1-chloro-2-bromo-3 propene was substituted for the 1,3 dichloro-2 butene. The product, 2-(2-bromoallylthio)-4,6-dimethylpyrimidine thus obtained was 57 grams (88% yield) of an amber oil analyzing 10.73% nitrogen and 12.26% sulfur compared to 10.81% nitrogen and 12.37% sulfur calculated for $C_9H_{11}BrN_2S$.

Example 3

In a manner analogous to Example 1, an equal molar quantity of cis and trans 1,2,3-trichloropropene was used as the halogenated alkene. The product, 2-(cis and trans 2,3-dichloroallylthio)-4,6-dimethylpyrimidine weighed 51 grams (82% yield). The amber colored oil analyzed 11.42% nitrogen compared to 11.24% calculated for $C_9H_{10}Cl_2N_2S$. The product was insoluble in water; and was soluble in ether, acetone, chloroform, benzene, heptane, and ethyl acetate.

Example 4

In this example 36.4 grams (0.25 mole) 1,3,3-trichloro-3 propene was substituted for the alkene in Example 1. The ether extract was dried over sodium sulfate and the ether removed under vacuum to yield the desired product, 2-(3,3-dichloroallylthio)-4,6-dimethylpyrimidine as an amber oil.

*Analysis.*—Calculated for $C_9H_{10}Cl_2N_2S$: N, 11.24%; S, 12.87%. Found: N, 10.70%; S, 12.55%.

Example 5

The same procedure as in Example 1 was followed except that 22.4 grams (0.125 mole) of 1,2,3,3-tetrachloropropene was added to a solution containing 22.1 grams (0.125 mole) of 2-mercapto-4,6-dimethylpyrimidine hydrogen chloride, 40 grams (0.25 mole) 25% sodium hydroxide and 150 ml. of water. The reaction mixture was heated for 24 hours, cooled, extracted with ether, the ether solution washed and the ether removed all as described in Example 1. An 88% yield of 2-(2,3,3-trichloroallylthio)-4,6-dimethylpyrimidine was obtained. The product was an amber oil which analyzed 9.86% nitrogen and 11.29% sulfur compared to 9.88% nitrogen and 11.31% sulfur calculated for $C_9H_9Cl_3N_2S$.

UTILITY

As indicated above, the new compounds herein are useful as agricultural chemicals. The new compounds are particularly effective when used as pre-emergent herbicides. They may be applied in toxic quantities by any of the many suitable methods, which are known to those familiar with application of agricultural chemicals. The preferred method is by applying the herbicidal compound dispersed in water as a spray.

The pre-emergent herbicidal activity of compounds of this invention was shown by application of emulsions of the pyrimidines in water. The emulsion was applied to seeded plots of ground before the grass or other plants emerged. The amount of active ingredient applied was 25 pounds per acre. The number of plants surviving thirteen or fourteen days after treatment with the new compounds was observed. The number of seeds emerging was converted to weighted herbicidal ratings based on average present germination of any particular seed lot times an injury factor. This accounted for irregularities of ratings on seeds which may vary in percent germination. The injury factor took into consideration any plants not expected to survive. Thus, phytotoxicity ratings were based on the number of plants which emerged and would survive as observed two weeks after planitng. Herbicidal ratings were assigned by means of the following conversion scale:

| Percent emergence | Phytotoxicity rating |
|---|---|
| 0–25 | 3 or severe. |
| 26–50 | 2 or moderate. |
| 51–75 | 1 or slight. |
| 76–100 | 0 or none. |

The results of the phytotoxicity study are tabulated in Table I:

TABLE I

| | Morning glory | Wild oat | Brome grass | Rye grass | Radish | Sugar beets | Foxtail | Crab grass | Pigweed | Soy bean | Wild buckwheat | Tomato | Sorghum |
|---|---|---|---|---|---|---|---|---|---|---|---|---|---|
| 2-(3 chloro-2-butenylthio)-4,6 dimethylpyrimidine | 1 | 3 | 3 | 3 | 2 | 3 | 3 | 3 | 3 | 0 | 1 | 3 | 3 |
| 2-(cis and trans 2,3-dichloroallylthio) 4,6 dimethylpyrimidine | 0 | 2 | 1 | 2 | 3 | 2 | 3 | 3 | 3 | 0 | 0 | 3 | 3 |
| 2-(3,3-dichloroallylthio)-4,6 dimethylpyrimidine | 0 | 3 | 3 | 3 | 1 | 3 | 3 | 3 | 3 | 0 | 2 | 1 | 3 |
| 2-(2,3,3 trichloroallylthio)4,6- dimethylpyrimidine | 1 | 2 | 1 | 3 | 1 | 2 | 3 | 3 | 3 | 1 | 0 | 2 | 2 |

The data in the table show that the compounds have high toxicity to the grassy plants and exert marked specificity. They are useful for control of certain grass and broadleaf weeds in soybeans. The 2-(3,3-dichloroallylthio)-4,6-dimethylpyrimidine and 2-(2,3,3-trichloroallylthio)-4,6-dimethylpyrimidine have high toxicity toward pigweed and severity ratings of 3 were obtained even when the application of the active ingredient was as low as 5 pounds per acre.

Under the conditions described in Table I, neither 2-(2-chloroallylthio)-4,6-dimethylpyrimidine nor 2-(3-chloroallylthio)-4,6-dimethylpyrimidine was toxic to any of the test plants but 2-(2-bromoallylthio)-4,6-dimethylpyrimidine was phytotoxic to both foxtail and pigweed.

It is intended to cover all changes and modifications of the examples of the invention herein chosen for purposes of disclosure which do not constitute departures from the spirit and scope of the invention. The matter contained in each of the following claims is to be read as part of the general description of the present invention.

What is claimed is:

1. A compound of the formula

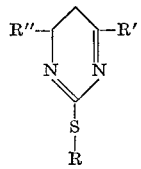

where R is $-CH_2CBr=CH_2$ or $CH_2CH=CX_2$, $-CH_2CX=C(X)H$, $-CH_2CX=CX_2$, $-CH_2CH=CXCH_3$ where X is Cl or Br and R' and R" are lower alkyl.

2. Compounds according to claim 1 where R is 3,3-dichloroallyl, 2,3-dichloroallyl, 2,3,3-trichloroallyl, 3-chloro-2-butenyl, or 2-bromoallyl.

3. A compound according to claim 1 where R is (3,3-dichloroallyl) and R' and R" are methyl and named 2-(3,3-dichloroallylthio)-4,6-dimethylpyrimidine.

4. A compound according to claim 1 where R is (cis and trans 2,3-dichloroallyl) and R' and R" are methyl and named 2-(cis and trans 2,3-dichloroallylthio)-4,6-dimethylpyrimidine.

5. A compound according to claim 1 where R is (2,3,3-trichloroallyl) and R' and R" are methyl and named 2-(2,3,3-trichloroallylthio)-4,6-dimethylpyrimidine.

6. A compound according to claim 1 were R is (3-chloro-2-butenyl) and R' and R" are methyl and named 2-(3-chloro-2-butenylthio)-4,6-dimethylpyrimidine.

7. A compound according to claim 1 were R is (2-bromoallyl) and R' and R" are methyl and named 2-(2-bromoallylthio)-4,6-dimethylpyrimidine.

References Cited

UNITED STATES PATENTS 3,223,707  12/1965  Brokke  260—251

ALEX MAZEL, Primary Examiner

R. V. RUSH, Assistant Examiner

U.S. Cl. X.R.

71—92